Aug. 16, 1966　　V. F. ZAHODIAKIN　　3,266,546
MOUNTING MECHANISM
Filed April 6, 1964
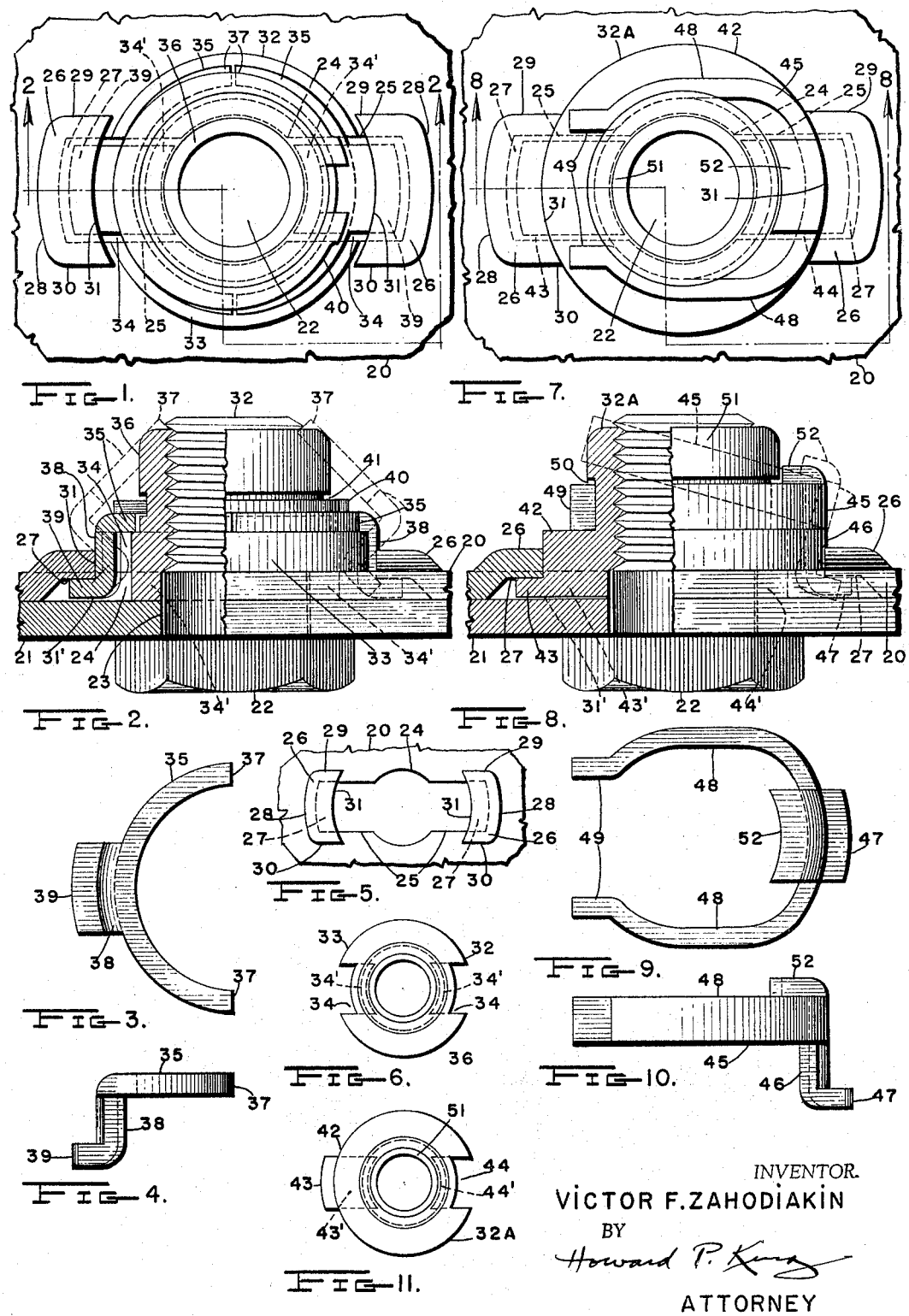
INVENTOR.
VICTOR F. ZAHODIAKIN
BY
Howard P. King
ATTORNEY 3,266,546
MOUNTING MECHANISM
Victor F. Zahodiakin, P.O. Box 689, Summit, N.J.
Filed Apr. 6, 1964, Ser. No. 357,654
8 Claims. (Cl. 151—41.76)

In its broadest aspect, the present invention relates to a mechanism comprising a receptacle releasably mounted with respect to a basal member, said receptacle being constituted to receive and retain an applied element therein. More specifically, for purposes of this disclosure, the mechanism is arbitrarily illustrated as a receptacle having characteristic of a threaded nut releasably retained with an interlocked engagement on a basal member of which one example is a sheet metal panel. The receptacle is retained substantially fixed in its appointed position and may be employed to receive a bolt or the like by use of which another prefabricated panel or member may be clamped in juxtaposition to the basal member, or may be otherwise utilized for receiving and retaining any other element requiring releasable attachment to a basal member.

In the past, threaded nuts or equivalent receptacles have been prevented from escape from the member on which located, by means of welding, riveting, use of adhesives, and other means effecting permanent attachment; however, when such a nut or its threads or receiving socket thereof becomes damaged or the threads stripped, it becomes a major operation to remove and replace the receptacle, and a primary object, broadly stated, of the present invention is to provide a mechanism entirely eliminating such an obstacle to removal and replacement of an otherwise substantially fixed receptacle or nut without involving difficulty or injurious operations.

Basically, the invention proposes a securely held but readily releasable receptacle to cooperate with a preformed aperture in a basal member therefor.

Otherwise expressed, the invention provides an improved mounting mechanism in which a receptacle is detachably yet positively mounted in juxtaposition to a basal member and retained in its appointed place without use of rivets, screws, pins, welds, adhesive, or the like, so as to avoid permanent attachment such that removal would introduce great expense and damage to said member in whole or in part.

Also viewed broadly, a consideration of the invention is provision of an improved mechanism of detachable character in which a receptacle will not become inadvertently detached from its basal member due to any causes involved in use, such as intense high frequency vibration, fatigue, impact, torque, extraneous forces, and so forth.

An important object of the invention is to provide a positive, yet separable, interlock between the receptacle and the basal member.

Another important object of the invention is to not only restrict rotation, but also to prevent longitudinal displacement of the receptacle with respect to the basal member when releasably assembled.

The invention further proposes an improved mechanism which is extremely strong, resistant to tension, shear and torque stresses.

The invention seeks and attains a simple and readily operable improved construction of extremely low cost to manufacture, install and maintain, not only on initial installation, but also upon renewal, replacement, and/or substitution.

Furthermore, the mechanism is constructed in such a way as to enable the receptacle or nut to be attached in its appointed place without requiring the use of any tool.

An outstanding feature of the invention is the improved locking means functioning to both retain the receptacle from undesired rotation and from escape.

Important amongst the objects of the invention, is provision of a construction requiring only shallow drawing of metal of the basal member in formation of detents thereon, such drawing producing only gradual bends in the metal of the basal member, thereby adapting the invention to use with substantially hard metals, such as heat-treated aluminum, medium carbon steel, and so forth, which are impractical for use where deep drawing and sharp bends are required.

The invention attains a desired extensive surface engagement of said detents and the interlocking projection or foot of the removable portion of the mechanism.

An important constructional feature of the interengagement of the detents with said removable portion of the mechanism, is a foot construction having an abutment that follows the contour of the contiguous forward edge of the detent so that shear forces between the detent and foot will be substantially in line with and at said abutment.

Somewhat more specifically, the invention provides a construction utilizing a spanner type of lock adapted to be readily slid into place from a tilted initial position to a final locking position perpendicular to the axis of the receptacle.

Supplemental to the foregoing object, the invention provides for releasably securing the lock in its said final locking position.

One form of the invention provides for utilization of a completely rigid spanner type of lock, and an alternative form provides for utilization of a lock resilient toward and away from the receptacle axis but rigid in a direction longitudinal to the axis.

It also is within the scope of the invention to provide a structure of the heretofore indicated character also adapted for "floating" assembly on a basal member.

Other objects, advantages, beneficial results and structural novelty will appear to persons skilled in the art to which the invention appertains, both by direct recitation thereof and by implication from the context as the description proceeds.

Referring to the accompanying drawing, in which like numerals of reference indicate similar parts throughout the several views:

FIGURE 1 is a plan view of one form of the invention in position of use on a panel or basal member;

FIGURE 2 is a cross-sectional view taken on line 2—2 of FIG. 1;

FIGURE 3 is a plan of a semi-circular lock alone;

FIGURE 4 is an elevational view of said lock;

FIGURE 5 is a plan view of the portion of said basal member involved in the invention, but at a much reduced scale from the showing of FIG. 1;

FIGURE 6 is a plan view of the receptacle or nut alone, shown on the same scale as that of FIG. 5;

FIGURES 7–11 inclusive are views corresponding respectively to FIGS. 1–4 and 6, and showing a modified construction of receptacle and lock.

In the specific embodiment of the invention disclosed in the forms thereof illustrated in the drawing, it may first be said that the basal member 20 is prefabricated ready for use, and has the same construction in its use with both forms of the presently shown receptacles and locks. Said basal member may be considered, by way of example, as one of the many plates or panels used in construction of air-craft, but is not necessarily limited to such employment. The invention provides means for securely bolting a second member 21 flatwise against the basal member 20 at margins where the two members overlap. At the location where bolt 22 is to pass through, said second member 21 has a round hole 23 commensurate to the size of the bolt shank which is inserted therethrough with the bolt-head engaging at the under face of said second member. A double key-hole aperture 24 is provided in the basal member 20 with the rounded portion thereof located to register with the bolt hole 23 of the second member, whereby the bolt may be admitted therethrough. In consequence of the double key-hole character of said aperture 24, radiating slots 25 are provided at opposite sides of the rounded middle part of that aperture and are of less width than the diameter of said middle part.

At the outer ends of said slots 25, the basal member 20 is provided with detents 26 formed by drawing a limited area of said member to project upwardly therefrom to provide a plateau 27 closed at three sides 28, 29, 30 intact with the adjacent metal of the generally planar area of the basal member, and with its fourth side 31, which faces toward the middle of the aperture, arcuate on a radial center coincident with the center of the rounded mid-portion of the aperture. The construction therefore provides a port opening 31' under the plateau 27 at said fourth edge of each detent as continuations of said slots 25. The angles of the integral sides 28, 29, 30 with the plateau and with the adjacent metal of the basal member are obtuse angles, and the presence of three closed sides integral with each other and with the plateau and with the adjacent metal of the basal member, together with the use of obtuse angles, renders the detent exceedingly strong so that it can resist all probable applications of forces, blows or pressures encountered in use tending to deform or crush the detent, and provides a construction wherein cracks in the metal will not occur. This attribute of strength in the detent is augmented by the fact of only shallow drawing thereof, the shallow drawing also having the benefit of avoiding likelihood of the metal developing cracks or splits. The shallow drawing employed is an off-set of the plateau 27 not to exceed in height the thickness of the metal of the basal member 20, and the transition to the slope of the sides 28, 29, 30 where the drawing occurs, is made very gradual, so far as possible, in the contour from the planar area of the basal member to said plateau.

In drawing substantially hard metals, such as heat-treated aluminum or medium carbon steel, generally used in the air-craft industry, deep drawings are impractical, so that it is essential to this invention that the construction be one wherein shallow drawing of the metal of the basal member may be employed. In some instances, the basal member may be a hard plastic molded to its final shape, together with the prefabricated aperture, likewise having the advantage of greater strength resulting from shallow off-set of the detents.

The nut or receptacle, designated in FIGS. 1, 2 and 6 by numeral 32, and in FIGS. 7, 8 and 11, by numeral 32a, may conveniently be externally of generally cylindrical configuration, and internally hollow and screw-threaded about the same axis, adapted to receive afore-mentioned bolt 22. Both forms of nut or receptacle are adapted to have locks applied thereto for releasably retaining the receptacle at its appointed position on the basal member, but as those locks differ somewhat in the showings herein, they will be separately described.

Referring to FIGS. 1, 2 and 6, the receptacle there shown provides, at its bottom end, a peripheral flange 33 the axial thickness whereof is at least as great as the combined distance of off-set of the detent plateau 27 and thickness of the basal member. The radius of said flange is, with tolerance for clearance, and for "floating" assembly if used, substantially equal to the radius heretofore mentioned of the arcuate front edges 31 of the plateaus 27, so that the flange may seat flatwise at its bottom face on the generally flat area of the basal member marginally around aperture 24 in a location between said detents 26. Said flange 33 is provided with corresponding diametrically opposite gaps 34 at its outer periphery of equal depth of the flanges and of width substantially the same as the width of the basal member slots 25. At the under face of the flange and radially inwardly from said gaps 34 in line therewith, are lugs 34' having a depth substantially, but not exceeding, the thickness of the basal member, adapted to be received by said slots 25. In placing the receptacle on the basal member, said lugs 34' are located, by rotating the receptacle if necessary, so as to be juxtaposed to and depressed into said slots. When in this position, the receptacle is ready to receive the lock for releasable retention on the basal member.

The lock of FIGS. 1 and 2, comprises two separate semi-circular yokes 35, duplicates one of the other, and of which one is shown alone in FIGS. 3 and 4. The yokes together embrace around a cylindrical body portion or barrel 36 of the receptacle, said body portion having a smaller diameter than said flange 33, said body portion and flange being integral and coaxial with each other. In their locking positions, said yokes 35 lie upon the top of the flange. Furthermore, said yokes are rigid, so that when in place, can flex neither radially nor in an axial direction. By virtue of the semi-circular form of said yokes, the ends 37 thereof for each yoke are substantially in a diametric-axial plane, so that when the two yokes are applied to the receptacle, corresponding ends of the opposed yokes substantially engage, giving the effect of a rigid ring around the receptacle, but with such ring diametrically split, introducing discontinuity in the ring.

Medially between said ends 37 of each semi-circular yoke, there is a rigid leg 38 integral therewith and depending at the outside thereof and terminating at its lower end in an outwardly directed foot 39. The leg is longitudinally segmentally cylindrical on a radius the center of which is coaxial to the center of curvature of the arcuate yoke, and the foot terminates outwardly with a correspondingly curved edge. The junction of the outer convex surface of the leg 38 with its foot 39 is formed as a sharp angular corner, namely 90°, as it is desired that the foot project a maximum possible distance under the detent plateau 27 in surface engagement therewith in use, and that simultaneously the front arcuate edge 31 of the detent will be engaged by the convex surface of the leg as shown in FIG. 2. Lifting force applied to the yoke will then tend more to produce a shear on the foot at said junction, rather than a bending moment on the foot. The depth of the leg 38 is made correctly to obtain flatwise engagement of the under face of the yoke on the top of the flange when the foot makes its surface engagement under the plateau of the detent. The width of the leg and foot is less than the width of the flange gap 34 for purpose of clearance, and, if desired, is made adequate to permit "floating" assembly. In any event, the proportions will be adapted for entry of the foot into the slot 25 of the basal member and under said plateau 27 of the detent 26, and when so situated, the leg, foot and previously described lugs, will limit rotation of the flange on the basal member. Simultaneously, the lock will be prevented from axial movement by its engagement with the detent and the receptacle will be prevented from axial movement by the over-lying relation of the yoke upon the flange.

The foot 39 of the yoke 35 can be applied to the basal member and detent by tilting it and introducing the foot into the flange gap 34 downwardly and outwardly of a respective slot 25 and thence into port 31' and under the detent plateau 27 with a simultaneous depression of the forked or spanner ends of the yoke downwardly toward the flange from the dotted-line position to the full-line position shown in FIG. 2. Thereafter a resilient contracting split ring 40 is applied to body portion or barrel 36 of the receptacle and snapped into a prepared groove 41 peripherally there-around at a location immediately above the said yoke to thereby releasably secure the yokes which in turn retain the receptacle from undesired rotation or from escape in an axial direction.

Giving attention now to the modified construction illustrated in FIGS. 7-11, it will be remembered that utilization of the receptacle 32a thereof with reference to prefabricated basal member 20 and second member 21 to clamp those members together with a bolt 22 passing therethrough into the threaded hollow of the receptacle is in accord with the full description hereinabove given. Instead of having a locking means composed of the two yokes and resilient split ring, the present modification provides for a single-element locking means in conjunction with certain differences in the receptacle body and flange. The receptacle 32a is again of cylindrical character, having a peripheral flange 42 at its bottom and with the under surface of the flange and receptacle body in a common plane, said surface being interrupted as before, with a pair of diametrically opposed lugs 43' and 44' having a depth substantially, but not greater than, the thickness of the basal member. It will be observed that one of said lugs, namely lug 43', is longer than the other one, and extends to the outer edge of the flange 42. There is no gap in the flange above this longer lug 43'. However, at the opposite side of the flange 42 both a gap 44 in the flange and a radially short lug 44' under the flange are present, as was the circumstance for both lugs and gaps of the previously described construction. Here, as before, both lugs are of appropriate width to enter the slots 25 of the basal member 20 and thereby keep the receptacle from undesired rotation on the basal member. At the outer end of the said long lug 43', integral therewith, there is a radially projecting foot 43 the bottom face whereof is in a common plane with the bottom of the lug 43'. The thickness of said foot is equivalent to only the off-set height of the plateau 27 of detent 26 and therefore less than the thickness of the flange. The width of said foot 43 is commensurate with the width of basal member slot 25, enabling the said foot to be inserted into said slot and under the plateau, and as said foot is rigid, its said insertion will retain that side of the receptacle in fixed but removable position on the basal member. Diametrically opposite from said foot, said flange aforesaid single gap 44 corresponding in character to either one of the heretofore described gaps 34.

The lock, again referred to as a yoke, and designated by numeral 45 is considerably more than semi-circular so as to alone embrace the receptacle when applied thereto. Medially of the contour length of the yoke, there is a depending rigid leg 46 with an outwardly directed foot 47 at its bottom end, said leg and foot having all of the structural and functional attributes heretofore described with respect to leg 38 and foot 39 of FIGS. 1-4.

The arms 48 of the yoke of FIGS. 7-10, are resilient in a radial direction, but unyielding or rigid in an axial direction. Opposite to the medial portion of the yoke where the said leg 46 is located, the yoke provides a discontinuity by terminating said arms 48 as parallel projecting ends 49 at a distance apart less than the curved span of the yoke. These projecting ends will enable a person to spread the arms resiliently apart for release of the lock or for other purposes.

Immediately above the flange 42, the receptacle 32a is provided with a peripheral groove 50 of proper dimensions to receive the yoke arms 48 therein, and above said groove the head portion 51 of the body or barrel portion of the receptacle is only slightly greater in diameter than the bottom of the groove. The barrel is rounded at its end so the yoke can be spread and forced downwardly over the head portion to snap into said groove. As in the previous construction described above, the yoke is applied by tilting it and inserting the foot thereof in the gap 44 of flange 42 and into the respective slot 25 of the basal member and port 31' thereof, and simultaneously pressing the yoke downwardly over the receptacle head 51 until it snaps into groove 50, at which time it will be juxtaposed against the flange and will lock the receptacle in place.

It may be pointed out, that since the yoke is applied over the head end of the body or barrel of the receptacle, rather than by endwise sliding into the groove, it will be the arms, where traversing the sides of the receptacle, that resiliently engage in said groove substantially tangential to the bottom thereof. The yoke is somewhat elongated to accommodate this stated mode of applying to the receptacle. It is, however, desirable to keep the yoke foot 47 slid fully home under its plateau when the yoke is in its locking position. For this purpose, a spacer 52 is provided at the medial portion of the yoke to extend therefrom into engagement with the receptacle. This spacer is readily formed by bending a tab from the upper edge of the yoke to project radially inwardly toward the receptacle, said tab constituting the spacer and becoming operative only upon completion of swing of the yoke to its final horizontal position. The inward edge of said spacer engages at the side of head 51 of the receptacle, and said edge is preferably arcuate with a radius of curvature corresponding to the radius of the said head.

I claim:

1. A mechanism of the character described, comprising in part a basal member and in part a device for removable attachment to the basal member, said basal member having two detents projecting from a surface thereof and providing open ports directed toward each other, and said device adapted to be located between said detents, said device consisting of at least two elements separable one from the other, one said element having a first rigid foot extending longitudinally toward and tiltably insertable in a said port under one of said detents, and another said element having a second rigid foot separately carried thereby from the element carrying the first said foot, said second foot extending longitudinally toward and tiltably insertable in the said port under the other detent, each said element and respective foot carried thereby constituting a rigid entity tiltable with respect to said basal member and to the respective detent for introduction of the foot into its port and under the detent thereat, said mechanism including means maintaining said elements assembled with respect to each other and with said feet engaged under said detents.

2. A mechanism in accordance with claim 1, wherein each said foot is integral with and parallel to a semi-circular yoke individual thereto.

3. A mechanism in accordance with claim 2, wherein an integral rigid leg intervenes between each said yoke and its foot.

4. A mechanism of the character described, comprising in part a detachable receptacle and in part a basal member having a face engageable by and on which said receptacle is detachably mounted, said basal member having detents projecting in fixed positions from said face for receiving said receptacle therebetween, said receptacle having a peripheral flange at its bottom and a generally planar bottom face interrupted with at least one projection depending below said bottom face laterally eccentric to the receptacle axis and engageable non-rotatably both clockwise and anti-clockwise in said basal member whereby said bottom face is adapted to be disposed flatwise and non-rotatably on said basal member, said receptacle having a barrel portion of smaller diameter than said flange, said barrel portion having a peripheral groove, and a lock on said receptacle, said lock comprising a yoke having a discontinuity admitting introduction of said yoke over the end of said barrel portion to snap into said groove, said lock having a foot extending in a direction radial to said axis, said foot being longitudinally tiltable crosswise with respect to said receptacle and longitudinally movable in a direction away from said axis for entry of said foot into interlocking engagement under one of said detents to prevent axial displacement of said receptacle, and said yoke having a spacer at the part thereof opposite to said discontinuity, said spacer extending to and making engagement with said barrel portion of the receptacle when said yoke is in said groove.

5. A mechanism of the character described, comprising in part a detachable receptable and in part a basal member having a face engageable by and on which said receptacle is detachably mounted, said basal member having detents projecting in fixed positions from said face for receiving said receptacle therebetween, said receptacle having a peripheral flange at its bottom and a generally planar bottom face interrupted with at least one projection depending below said bottom face laterally eccentric to the receptacle axis and engageable non-rotatably both clockwise and anti-clockwise in said basal member whereby said bottom face is adapted to be disposed flatwise and non-rotatably on said basal member, and a lock on said receptacle, said lock having a foot extending in a direction radial to said axis, said foot being longitudinally tiltable crosswise with respect to said receptacle and longitudinally movable in a direction away from said axis for entry of said foot into interlocking engagement under one of said detents to prevent axial displacement of said receptacle, said flange also having a foot projecting radially therefrom at one side thereof, said foot of the flange having location between the top and bottom surfaces of the basal member and engaging under one of said detents, and said flange having a gap at its opposite side from said foot of the flange, and said foot of the lock projecting into said gap and under the other of said detents.

6. A mechanism in accordance with claim 5, wherein said foot of the lock as well as the foot of the flange has a location between the planes of the top and bottom surfaces at diametric opposite sides of said axis and engaging under respective said detents thereat.

7. A mechanism in accordance with claim 5, wherein there are two of said projections aforesaid as depending below said bottom face of the flange, said projections being diametrically opposed and with one longer than the other in a radial direction, the longer one extending to the periphery of said flange and having aforesaid radial foot of the flange projecting thereat, and the aforesaid gap in the flange being located at the outer end of the shorter said projection, said lock having a leg adapted to be received in said gap, and aforesaid foot of the lock received in the said other detent being constituted as a projection from said lock leg.

8. A mechanism of the character described, comprising in part a detachable receptacle and in part a basal member having a face engageable by and on which said receptacle is detachably mounted, said basal member having detents projecting in fixed positions from said face for receiving said receptacle therebetween, said receptacle having a peripheral flange at its bottom and a generally planar bottom face interrupted with at least one projection depending below said bottom face laterally eccentric to the receptacle axis and engageable non-rotatably both clockwise and anti-clockwise in said basal member whereby said bottom face is adapted to be disposed flatwise and non-rotatably on said basal member, said flange having diametrically opposed gaps, and a lock on said receptacle, said lock providing yokes which in cooperation with each other embrace said receptacle, each said yoke having a leg depending into a respective said gap and each said leg having a foot extending in a direction radial to said axis, said foot being longitudinally tiltable crosswise with respect to said receptacle and longitudinally movable in a direction away from said axis for entry of said foot into interlocking engagement under a respective one of said detents to prevent axial displacement of said receptacle.

References Cited by the Examiner

UNITED STATES PATENTS

| 1,768,505 | 6/1930 | Carr | 85—80 |
| 1,907,506 | 5/1933 | Coburn | 85—8.8 |
| 2,021,241 | 11/1935 | Mall | 85—8.8 |
| 2,026,454 | 12/1935 | Benzig | 85—8.6 |
| 2,144,553 | 1/1939 | Simmonds | 151—41.76 |
| 2,235,530 | 3/1941 | Mercer | 85—8.8 |
| 2,266,832 | 12/1941 | Tinnerman | 85—80 |
| 2,379,296 | 6/1945 | Harbert | 85—8.6 |
| 2,813,732 | 11/1957 | Hird | 85—8.8 |
| 3,219,088 | 11/1965 | Zahodiakin | 151—41.75 |

FOREIGN PATENTS 658,776   10/1951   Great Britain.

CARL W. TOMLIN, *Primary Examiner.*

M. PARSONS, JR., *Assistant Examiner.*